United States Patent
Schmauser

(10) Patent No.: US 6,929,192 B2
(45) Date of Patent: Aug. 16, 2005

(54) VALVE FOR CONTROLLING FLUIDS AND METHOD FOR MEASURING PRESSURES

(75) Inventor: Till Schmauser, Nuremberg (DE)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 10/344,032

(22) PCT Filed: Jun. 7, 2002

(86) PCT No.: PCT/DE02/02076

§ 371 (c)(1),
(2), (4) Date: Apr. 10, 2003

(87) PCT Pub. No.: WO02/101228

PCT Pub. Date: Dec. 19, 2002

(65) Prior Publication Data

US 2003/0160118 A1 Aug. 28, 2003

(30) Foreign Application Priority Data

Jun. 8, 2001 (DE) .......................... 101 27 932

(51) Int. Cl.⁷ ................................ B05B 3/04
(52) U.S. Cl. ................ 239/102.2; 239/585.1; 251/129.06
(58) Field of Search ............ 239/102.1, 102.2, 239/585.1, 585.3–585.5, 90–96, 88, 89; 137/557; 251/129.06

(56) References Cited

U.S. PATENT DOCUMENTS

| 3,596,507 | A | | 8/1971 | Hayakawa et al. |
| 4,662,564 | A | * | 5/1987 | Okuda ........................ 239/73 |
| 6,422,211 | B1 | * | 7/2002 | Boecking .................... 123/501 |
| 6,543,700 | B2 | * | 4/2003 | Jameson et al. ......... 239/102.1 |
| 6,663,027 | B2 | * | 12/2003 | Jameson et al. ......... 239/585.1 |

FOREIGN PATENT DOCUMENTS

| DE | 196 22 651 A | 12/1996 |
| DE | 199 60 971 A | 3/2001 |
| EP | 0 390 461 A | 10/1990 |
| GB | 1 421 737 A | 1/1976 |
| WO | 99 67528 A | 12/1999 |

OTHER PUBLICATIONS

Patent Abstracts of Japan vol. 1998, No. 05, Apr. 30, 1998 & JP 10 009084 A, Jan. 13, 1998.
Patent Abstracts of Japan vol. 009, No. 245 (M–418), Oct. 2, 1985 & JP 60 098162 A, Jun. 1, 1985.
Patent Abstracts of Japan, vol. 013, No. 067 (M–798), Feb. 15, 1989 & JP 63 268970 A, Nov. 7, 1988.

* cited by examiner

Primary Examiner—Gene Mancene
Assistant Examiner—Thach H. Bui
(74) Attorney, Agent, or Firm—Michael J. Striker

(57) ABSTRACT

The present invention relates to a valve for controlling fluids, in particular a fuel injection valve, which has a valve member (3) disposed in a housing (11) for opening or closing a communication with a downstream chamber (18). An actuating element (2) is provided for actuating the valve member (3). The valve member (3) is prestressed in a prestressing direction by means of a prestressing element (10). The valve member (3) is also in communication with a sensor element (9), for picking up pressure information from the chamber (18) downstream of the valve member. The sensor element (9) can be provided as a separate component, or in an especially preferred embodiment, the actuating element is simultaneously used as the sensor element as well.

4 Claims, 4 Drawing Sheets

VALVE FOR CONTROLLING FLUIDS AND METHOD FOR MEASURING PRESSURES

BACKGROUND OF THE INVENTION

The present invention relates to a valve for controlling fluids, in particular a fuel injection valve, with an integrated device for determining pressures, and to a method for determining pressures and pressure changes in a combustion chamber of a motor vehicle.

In conventional engines, so-called knocking sensors are used to determine knocking, for instance. These known knocking sensors detect engine knocking by excitation of a seismic mass. The mechanical pulses are converted into electrical signals, which are evaluated by a control unit. Knocking sensors are connected from outside mechanically solidly to the cylinder or engine block. With such knocking sensors, however, only knocking can be detected. Combustion chamber pressure sensors are also known, which are provided in their own bore in the cylinder head for continuous measurement of the gas pressure in the combustion chamber. A disadvantage of these known pressure pickups is that each must be provided with its own bore in each cylinder in the cylinder head of the engine and also each with its own line per cylinder, which is relatively complicated and makes the production costs higher.

What is known as ion current measurement is also known, which is based on measuring the current flow via ions when an electrode voltage is applied, the ions being produced upon ignition of the mixture by an ignition spark. If as a result of the measuring voltage applied to the spark plug electrodes current flows via these ions, then the gas mixture is ignited. By means of ion current measurement, for instance at the spark plug electrodes, it becomes possible to obtain controlled variables for controlling the engine. By means of ion current measurement, misfiring and engine knocking can for instance be detected, and mixture preparation can be optimized.

The known devices for detecting misfiring or knocking are relatively complicated, however, and entail additional cost because of additional components and their assembly.

SUMMARY OF THE INVENTION

The device according to the invention for picking up pressures and pressure changes has the advantage over the prior art that it is integrated directly with a valve for controlling fluids. The valve for controlling fluids includes a valve member, disposed in a housing, which opens or closes a communication with a downstream chamber. An actuating element for actuating the valve member and a prestressing element for prestressing the valve member in a prestressing direction are also provided. The valve member is in contact with a sensor element, so as to pick up pressure information from the downstream chamber. The valve of the invention with integrated pressure pickup is used in particular in engines as a fuel injection valve or as an inlet/outlet valve. Since the valve, via the valve member, has a direct communication with the downstream chamber, such as a combustion chamber, the pressures or pressure changes that occur there can be transmitted to the sensor element via the valve member. Thus no further bore in the cylinder head is required.

In another preferred embodiment of the invention, the sensor element is disposed outside the valve housing. The sensor element can either be disposed as a separate component between the valve housing and a cylinder head and prestressed by means of a fastener, or it may be an integral component of the valve housing. The pressure course in the combustion chamber is then transmitted to the pressure sensor via the housing. This pressure information can then, via an electrical circuit or directly in the form of an electrical signal, be forwarded to a regulating device and evaluated. Thus the pressure sensor can be used as a so-called "add-on version", particularly for retrofitting injection valves. If the sensor element is embodied integrally, it can for instance be fused with the injection valve housing. It is also possible, especially with electromagnetic actuators, to integrate a sensor into the flow of force. Moreover, in piezoelectric actuators or magnetostrictive actuators, to optimize the capacity of the actuator or the sensitivity of the sensor, it can be necessary to separate the actuator and the sensor.

It will be noted that the present invention can be used in any kind of valves and throttle valves for metering fluids with integral measurement of the pressure in the downstream chamber. The present invention can be used both with directly actuated valve needles or closure parts, and in hydraulically and/or mechanically boosted systems.

The actuating element of the valve member is preferably embodied as a piezoelectric actuator, an electromagnetic coil, or a magnetostrictive element.

In an especially preferred embodiment of the present invention, the actuating element is simultaneously also embodied as a sensor element. As a result, the provision of a separate sensor element can be dispensed with, since the already existing actuating element for actuating the valve member can simultaneously be used as a sensor element. This is especially preferably possible whenever the actuating element is embodied as a piezoelectric actuator or is a magnetostrictive element. If the actuating element is embodied as a piezoelectric actuator, the valve member is actuated by the piezoelectric effect in a known way. A predetermined voltage is applied to the piezoelectric actuator in order to cause a change in length of the piezoelectric actuator, so as to lift the valve member from its valve seat. The piezoelectric actuator maintains its change in length as long as the voltage is maintained unchanged. As a result, in the inactive phase of the piezoelectric actuator in which no change in the voltage takes place, it is possible for the pressure changes occurring in the downstream chamber, which are transmitted to the piezoceramic element via the valve member, to be picked up. Thus the piezoelectric actuator simultaneously acts as a sensor as well. Hence the piezoelectric element simultaneously acts as both an actuator and sensor. In use of the fuel injection valve, pressure changes caused by knocking can then be picked up in a simple way. It is equally possible for the piezoelectric element to be calibrated, so that an absolute pressure in the combustion chamber can be determined, in which case the applied voltage acts as a measurement variable. Hence via a control unit, for instance, an optimal instant of ignition can be determined. According to the invention, it is thus possible with different variant embodiments of the invention to determine pressures in various time slots; both dynamic pressures and absolute or relative pressures can be determined.

The above-described effect can also be achieved if the sensor element is embodied as a magnetostrictive element. In magnetostrictive elements, the geometric dimensions of a body change under the influence of a magnetic field. The expansion of the body takes place as a function of the magnetic field intensity. The expansion of the body is greater, the greater the magnetic field intensity. The reverse of this effect is known as the magnetoelastic or magnetomechanical effect. In it, a change in the magnetic induction is brought about under the influence of a mechanical stress. In the present invention, this can be employed to use the magnetostrictive element as both an actuator and a sensor; in the inactive phase of the valve member, the pressure changes are transmitted to the magnetostrictive element via the valve member and determined there, in accordance with the piezoelectric element, on the basis of the change that occurs in the magnetic induction. Terfenol-D can for instance be used as the magnetostrictive material. Thus with a magnetostrictive element as an actuator, this element can at the same time be used as a sensor as well, with which both pressure changes and, given suitable calibration, absolute pressures as well can be picked up.

In order to furnish an especially compact construction, the sensor element is preferably disposed on the same axis as the valve member.

Preferably, the sensor element embodied as a piezoelectric actuator is also prestressed by the prestressing element of the valve member. As a result, the number of components can be reduced still further.

If the actuating element is simultaneously used as a sensor element, then the line existing between the actuating element and a control/regulating device is preferably also used for signal transmission of the signals of the actuating element functioning as a sensor.

If the sensor element is provided in the form of a separate component, it is preferably disposed immediately adjacent the actuating element. The separate sensor element can be disposed between the valve member and the actuating element, for instance, or it is disposed on the opposite end of the actuating element from the valve member.

In the method of the invention for measuring pressures, that is, pressure changes, and with appropriate calibration, absolute pressures, in a combustion chamber of a motor vehicle, the pressure is transmitted to a sensor element via a valve member disposed at the combustion chamber. Thus the pressure prevailing in the combustion chamber, or the pressure changes occurring in the combustion chamber, are transmitted to the valve member, which is connected to the sensor element. Thus in the case of a fuel injection valve, for instance, the fuel injection valve is simultaneously use as a pressure pickup also. As a result, the number of components in the engine can be reduced, and in particular the production costs can be lowered significantly.

In a preferred embodiment of the method of the invention, the actuating element of the valve member is simultaneously used as a sensor element also. As a result, the number of components can be reduced still further, and an especially compact valve can be furnished. If it is used as a fuel injection valve, the valve thus has the function of both injecting fuel and detecting pressures and pressure changes in the combustion chamber, so that knocking and misfiring in particular can be detected. Moreover, depending on the pressure prevailing in the combustion chamber, the instant of ignition can also be optimized, as can mixture preparation, which saves fuel and reduces pollutants. It should be noted that the method of the invention can also be used when the sensor element is disposed outside the valve housing (either as a separate component or as an integral component of the housing). The pressure information is then transmitted to the sensor element via the housing.

Especially preferably, the present invention is used in an outward-opening valve, since then the valve member protrudes into the chamber from which pressures and pressure changes are to be carried on to a sensor.

The present invention thus in a simple way solves the problem of picking up pressures in a chamber, and a combination of a valve and a pressure pickup is realized. The pressure is picked up by the movable valve member, which in the inactive phase of the valve (with the valve fully open or fully closed) can transmit the pressure to the sensor element. As a result, the dynamic pressure in particular of the flow is measured. If the sensor element is disposed outside the valve housing, then preferably a differential pressure between the combustion chamber and the environment is measured.

Especially preferably, a piezoelectric actuator or a magnetostrictive actuator of a fuel injection valve is used as the actuating element and as a pressure pickup sensor for picking up pressures or pressure changes in a combustion chamber of an engine. In a further preferred use of the present invention, the piezoelectric pressure sensor is mounted in prestressed fashion between a cylinder head and a valve head that reaches into the combustion chamber; the pressure sensor may be embodied as a separate component or as an integral component of the valve housing.

BRIEF DESCRIPTION OF THE DRAWINGS

A plurality of exemplary embodiments of the invention are shown in the drawing and will be explained in further detail in the ensuing description.

DETAILED DESCRIPTION OF THE PREFERRED EMBODIMENTS

Figure 1:
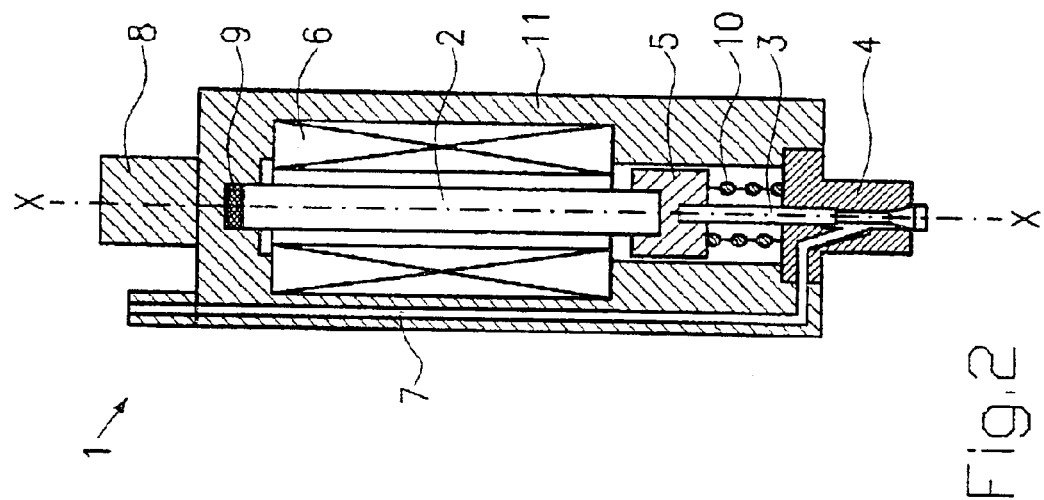
FIG. 1 shows a schematic sectional view of a valve for controlling fluids in a first exemplary embodiment of the present invention.

With reference to FIG. 1, a first exemplary embodiment of a valve 1 for controlling fluids in accordance with the present invention will be described below. The valve 1 is embodied as a fuel injection valve.

As shown in FIG. 1, the valve 1 includes a magnetostrictive element 2, which is embodied cylindrically and is used as an actuator. The actuator is surrounded by an electromagnetic coil 6. Via a connecting piece 5, the actuator is in communication with a valve member 3, which opens and closes a valve seat 4. A restoring spring 10 is disposed between the connecting piece 5 and the valve seat 4. The restoring spring 10 restores both the magnetostrictive element and the valve member 3, both of which are solidly connected to the connecting piece 5. Via the fuel supply line 7, fuel under pressure is delivered to a forward region of the valve member 3 (see FIG. 1).

As explained above, in the first exemplary embodiment the actuator comprises the magnetostrictive component 2 and the electromagnetic coil 6. Terfenol-D can for instance be used as material for the magnetostrictive component 2. In the first exemplary embodiment, the actuator is simultaneously used as a pressure pickup sensor, which picks up pressures or a pressure course, in the inactive phase of the valve, such as knocking in particular, from the engine combustion chamber.

The function of the actuator/sensor of the invention is as follows. If fuel is to be injected into the combustion chamber from the fuel supply line 7, a magnetic field is generated by the electromagnetic coil 6. Because of this magnetic field, the magnetostrictive component 2 lengthens in the direction of the valve member 3, which is positioned with its other end solidly in the housing 11 of the valve. This change in length of the magnetostrictive component 2 is transmitted via the connecting piece 5 to the valve member 3, which as a result lifts from its valve seat 4. As a result, the fuel under pressure in the line 7 can be injected into the combustion chamber. At the instant of the injection, the valve member 3 remains in its open position, in a so-called inactive phase. As a result, pressure changes in particular that occur in the combustion chamber during the injection when the valve member 3 is open can be transmitted to the magnetostrictive component via the valve member 3 and the connecting piece 5. By the reversal of the magnetostrictive effect, which is known as the magnetoelastic or magnetomechanical effect, the magnetostrictive component 2 is partially compressed. As a function of this mechanical stress, the magnetic induction changes, which can be picked up as a signal at the electromagnetic coil 6. Thus the actuator of the invention can simultaneously be used as a sensor as well. It should be noted that using it as a sensor is appropriate practically only whenever the valve is in its inactive phase, that is, at the instant of the open position of the valve or at the instant of the closing position of the valve, because otherwise incorrect signals will be picked up because of the motions of the valve needle into the open or closed position. It should be noted that depending on the embodiment of the valve member, it may be possible during the injection for only the dynamic pressure of the fluid to be measured, but not a relative pressure or a pressure change. Thus according to the invention it is unnecessary for a separate pressure pickup sensor to be provided at the combustion chamber. Thus an additional opening at the combustion chamber can be avoided, and the number of components and assembly costs can both be reduced.

It should be noted that instead of the combined magnetostrictive actuator-sensor, a combined piezoelectric actuator-sensor can be used. Moreover, given a suitable mechanical embodiment, the present invention can be used not only in an outward-opening valve as shown in FIG. 1, but also in an inward-opening valve.

Figure 2:
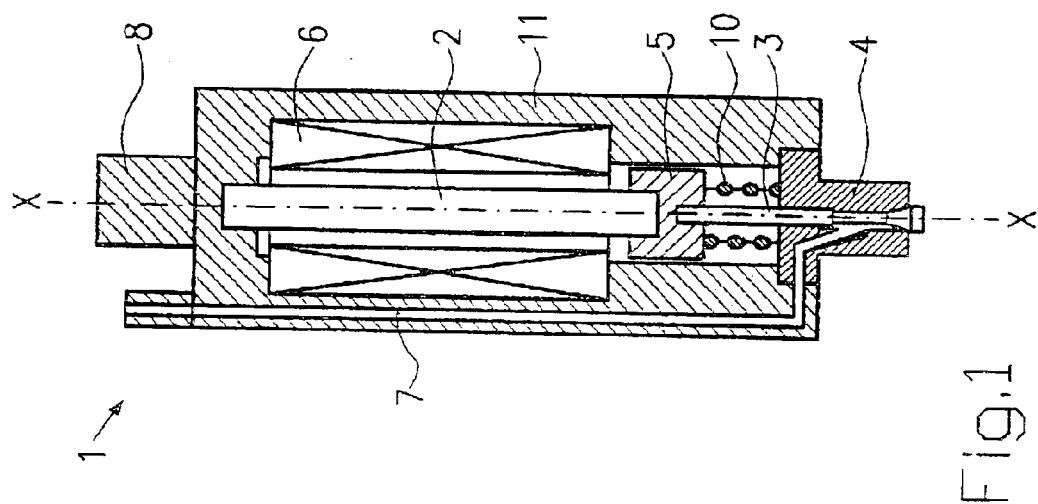
FIG. 2 shows a schematic sectional view of a valve for controlling fluids in a second exemplary embodiment of the present invention.

In FIG. 2, a valve in a second exemplary embodiment of the present invention is shown. Elements that are the same or functionally the same are identified by the same reference numerals as in the first exemplary embodiment.

The valve 1 in the second exemplary embodiment is essentially equivalent to the valve of the first exemplary embodiment. Unlike that exemplary embodiment, however, in the valve 1 of the second exemplary embodiment, a separate sensor is provided for picking up pressures in the engine compartment. The sensor 9 is embodied as a piezoelectric stack or is a simple piezoceramic plate, which has an annular or platelike shape. The piezoelectric sensor 9 is disposed between the magnetostrictive component 2 and the housing 11. The pressure course in the combustion chamber is transmitted, with the valve closed, via the valve needle 3 and the intermediate element 5 to the magnetostrictive component 2 and from there to the piezoelectric sensor 9. Thus the valve 1 embodied as a fuel injection valve simultaneously serves as a pressure pickup sensor as well; the piezoelectric sensor 9 is disposed on the same axis X—X as the valve member 3. Otherwise, the second exemplary embodiment is equivalent to the first exemplary embodiment, and so reference may be made to its description above.

Figure 3:
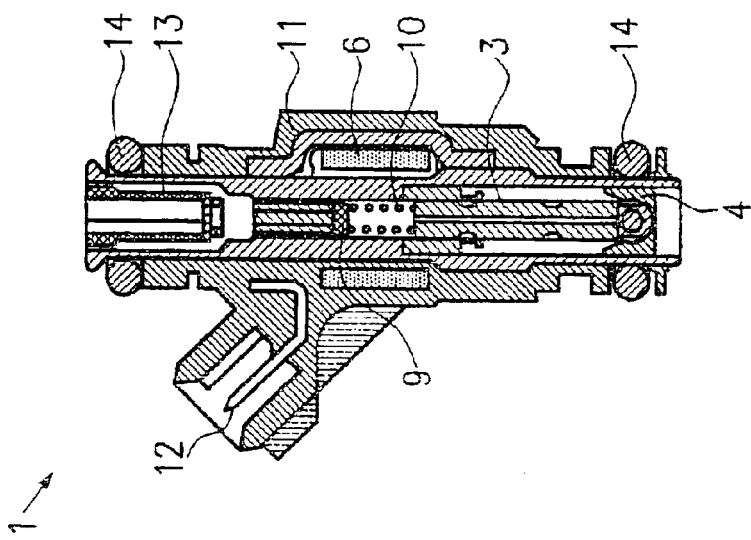
FIG. 3 shows a schematic sectional view of a valve for controlling fluids in a third exemplary embodiment of the invention.

In FIG. 3, a valve in a third exemplary embodiment of the present invention is shown. Elements that are the same or functionally the same are identified by the same reference numerals as in the first exemplary embodiment.

The valve shown in FIG. 3 is an electromagnetically actuated valve, which has a current coil 6 and a valve needle 3 with a magnet armature. A spring 10 keeps the valve needle 3 in its closed position. A pressure sensor embodied as a piezoelectric stack is also provided, which is disposed between the valve needle collar and the spring 10. The coil 6 is supplied with current via an electrical terminal 12. A filter screen 13 for filtering solid particles out of the fuel and two O-rings 14 to enable sealing off of the valve are also provided. As in the foregoing exemplary embodiments, in the open and closed positions without motion, pressure changes in the combustion chamber are transmitted to the piezoelectric sensor 9 via the valve member 3. If there is an additional extra measuring line, then in this exemplary embodiment pressure courses can be measured via the valve member even in the active phase. With the valve closed, the course of the absolute or relative pressure with respect to the environment is measured in particular, while with the valve open, depending on the embodiment of the valve member, optionally only the dynamic pressure of the fluid is measured.

Figure 4:
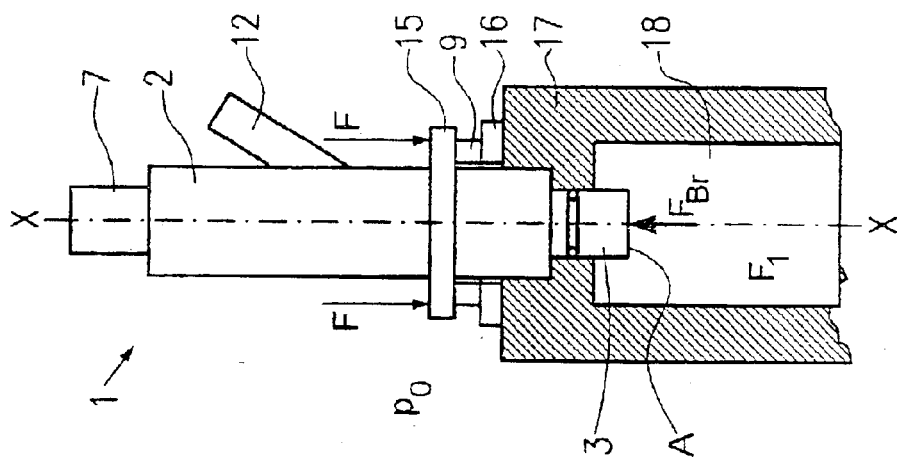
FIG. 4 shows a schematic sectional view of a valve for controlling fluids in a fourth exemplary embodiment of the invention.

In FIG. 4, a valve in a fourth exemplary embodiment of the present invention is shown. Elements that are the same or functionally the same are identified by the same reference numerals as in the foregoing exemplary embodiments.

As shown in FIG. 4, the highly schematically shown valve 1 includes an actuating actuator 2, which actuates a valve head 3. A piezoelectric sensor 9 is disposed between an insulating disk 16 and a fastening collar 15. A prestressing force F acts on the fastening collar 15. The valve 1 is disposed on a cylinder head 17 and also has a fuel supply line 7 as well as an electrical terminal 12. In this exemplary embodiment, the piezoelectric sensor is a separate component, which is disposed outside the valve housing. The valve 1, regardless of its design, is secured to the cylinder head in such a way that the piezoelectric sensor 9 is subject to the prestressing force F, caused by the securing to the cylinder head between the valve collar 15 and the cylinder head 17. This prestressing force F acts counter to a graph $F_{Br}$ in accordance with the end face area A of the valve head, as a result of the pressure difference between the combustion chamber 18 and the environment p0. In accordance with this fastening, depending on the pressure course in the combustion chamber 18, the result is a proportional force $F_{Br}$ that acts counter to the prestressing force. Thus as a function of the electrical circuit, a proportional course of the current or voltage results, which is forwarded to an evaluation unit, where it can be used to optimize the mixture preparation and the instant of ignition. To reduce interference from electrical and thermal factors, the piezoelectric sensor should be adequately insulated from the environment. In this arrangement, the transmitter of the mechanical force $F_{Br}$ that results from the end face area A and the pressure difference between the combustion chamber and the environment is not the valve needle itself but the entire valve. It should be noted that this kind of arrangement can also be used in other valves and throttle valves. A seal is also provided on the valve head 3.

Figure 5:
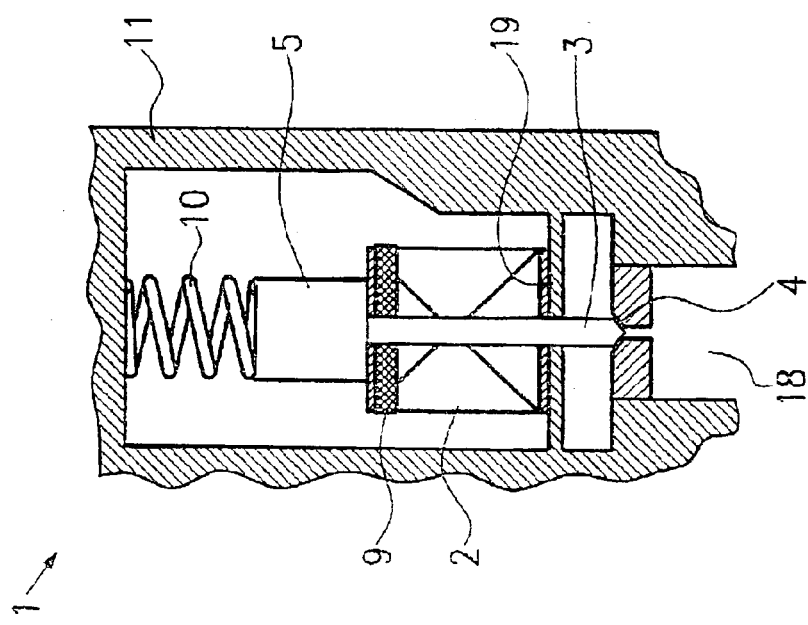
FIG. 5 shows a schematic sectional view of a valve for controlling fluids in a fifth exemplary embodiment of the invention.

In FIG. 5, a valve in a fifth exemplary embodiment of the present invention is shown. Elements that are the same or functionally the same are identified by the same reference numerals as in the foregoing exemplary embodiments.

As shown in FIG. 5, the valve 1 includes both a piezoelectric actuator 2 and a separate piezoelectric sensor 9. The actuator 2 and the sensor 9 are disposed immediately adjacent one another and are position between two platelike elements. The actuator 2 is solidly connected to a valve member 3, which opens and closes a valve seat 4 in order to establish a communication with a combustion chamber 18. Here the actuator 2 is braced on an abutment 19, so that upon triggering, it increases its length in the direction of a spring 10. The spring 10 is in communication with the actuator 2 via a connecting piece 5 and prestresses the actuator.

The mode of operation of the valve shown in FIG. 5 is such that when the piezoelectric actuator 2 is triggered, it increases its length in the direction of the spring 10, so that the valve needle 3 solidly connected to the piezoelectric actuator 2 lifts from its valve seat 4, and a fuel injection into the combustion chamber 18 can take place.

Pressure changes that occur, for instance from knocking, are transmitted via the valve needle 3 to the piezoelectric sensor 9 and from there are carried onward as signals to a control/regulating device. The same line that is present for triggering the piezoelectric actuator 2 can be used.

Figure 6:
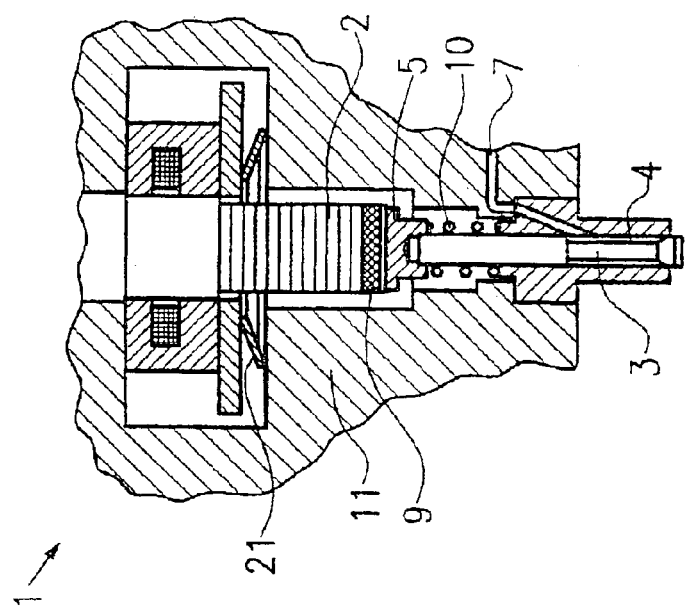
FIG. 6 shows a schematic sectional view of a valve for controlling fluids in a sixth exemplary embodiment of the invention.

In FIG. 6, a valve in a sixth exemplary embodiment of the present invention is shown. Elements that are the same or functionally the same are identified by the same reference numerals as in the foregoing exemplary embodiments.

As shown in FIG. 6, in the sixth exemplary embodiment once again a piezoelectric actuator 2 and a piezoelectric sensor 9 are embodied as two separate components. The piezoelectric sensor 9 is disposed between the piezoelectric actuator 2 and an intermediate piece 5 that is in communication with the valve needle 3. A spring 10 keeps the valve needle 3 in its closed position. A spring 21 prestresses both the actuator 2 and the sensor 9.

When the piezoelectric actuator 2 is triggered, it changes its length in the direction of its longitudinal axis, so that the stroke of the piezoelectric actuator 2 is transmitted via the connecting piece 5 to the valve needle 3, and the valve needle lifts from its valve seat 4. As a result, a communication between a fuel supply line 7 and a combustion chamber is opened, so that fuel is injected into the combustion chamber. The tip of the valve needle 3 is located partly in the combustion chamber.

If pressure peaks occur, for instance from knocking, in the combustion chamber, causing pressure changes in the combustion chamber, these changes are transmitted to the piezoelectric sensor 9 via the valve needle 3 and the connecting piece 5. From the piezoelectric sensor 9, the signals can then be forwarded to an evaluation unit. Otherwise, the sixth exemplary embodiment is essentially equivalent to the second through fifth exemplary embodiments, so that reference may be made to the descriptions of them given above.

Figure 7:
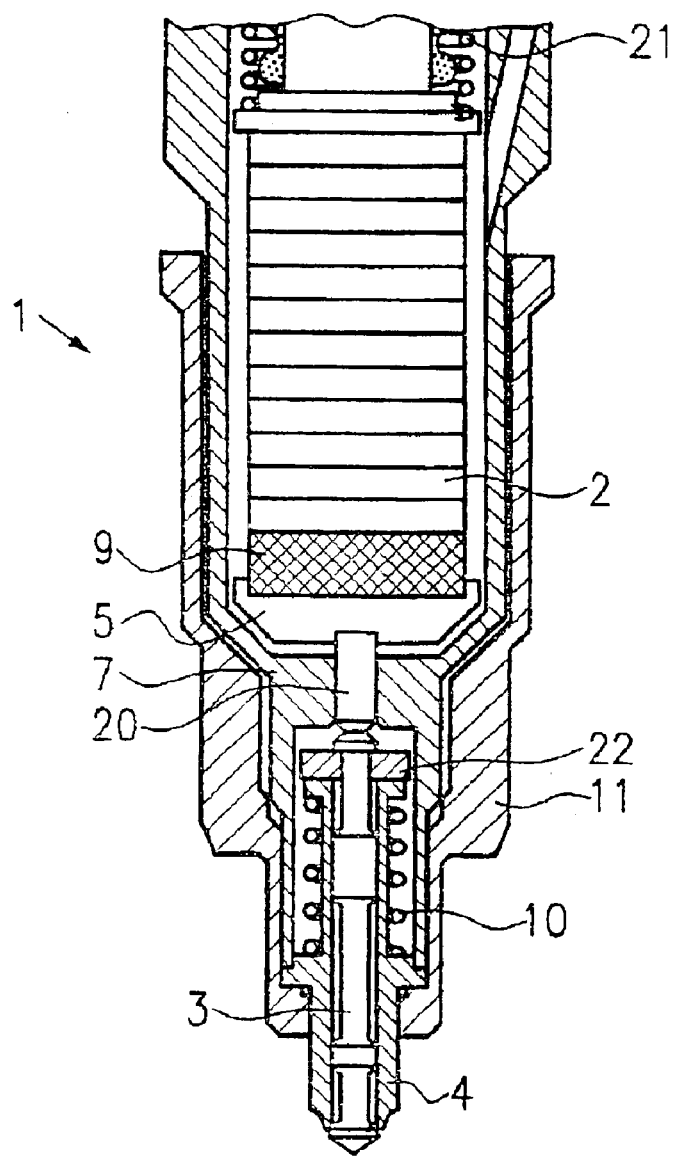
FIG. 7 shows a schematic sectional view of a valve for controlling fluids in a seventh exemplary embodiment of the invention.

In FIG. 7, a valve in a seventh exemplary embodiment of the present invention is shown. Elements that are the same or functionally the same are identified by the same reference numerals as in the foregoing exemplary embodiments.

The seventh exemplary embodiment is essentially equivalent to the sixth exemplary embodiment; unlike the sixth exemplary embodiment, in the seventh exemplary embodiment a first connecting piece 5 and a second connecting piece 20 are disposed between the valve needle 3 and the piezoelectric sensor 9. A separate prestressing spring 21 is also provided, in order to prestress the actuator 2 embodied as a piezoelectric element. A collar 22 is also provided in the valve needle 3, in order to support a restoring spring 10, which keeps the valve needle 3 in its closed position. Otherwise, the seventh exemplary embodiment is essentially equivalent to the exemplary embodiments described above, so that a detailed description of it can be dispensed with here.

The present invention thus pertains to a valve or throttle valve with an integrated pressure pickup for controlling fluids, and in particular to a fuel injection valve, which has a valve member 3, disposed in a housing 11, for opening or closing a communication with a downstream chamber 18. An actuating element 2 is provided for actuating the valve member 3. The valve member 3 is prestressed in a prestressing direction by means of a prestressing element 10. The valve head, which protrudes into the combustion chamber, is also in communication with a sensor element 9, in order to pickup pressure information from the chamber 18 downstream of the valve member. The sensor element 9 can be provided as a separate component or, in an especially preferred embodiment, the actuating element can simultaneously be used as a sensor element as well.

The above description of the exemplary embodiments of the present invention is intended solely for illustrative purposes and is not intended to restrict the invention. Within the scope of the invention, various changes and modifications can be made without departing from the scope of the invention or its equivalents.

What is claimed is:

1. A valve for controlling fluids in the form of a fuel injection valve, comprising:
    a valve member disposed in a housing, for opening or closing a communication with a downstream chamber;
    an electrically actuatable actuating element for actuating the valve member; and
    a prestressing element, which prestresses the valve member in a prestressing direction, wherein the actuating element is simultaneously formed as a sensor element, wherein at least in an inactive phase in which the valve member is not actuated, the actuating element detects pressure information from the downstream chamber and converts the information into electrical signals.

2. The valve of claim 1, wherein the actuating element is a piezoelectric actuator or a magnetostrictive element.

3. The valve of claim 1, wherein the actuating element actuates the valve member in an active phase, wherein in the active phase, the actuating element receives electrical signals.

4. The valve of claim 1, wherein the actuating element in the form of a sensor element is disposed on the same axis as the valve member.

* * * * *